(12) United States Patent
Liu

(10) Patent No.: US 10,901,548 B2
(45) Date of Patent: Jan. 26, 2021

(54) TOUCH SCREEN REAR PROJECTION DISPLAY

(71) Applicant: OmniVision Technologies, Inc., Santa Clara, CA (US)

(72) Inventor: Shenshen Liu, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/680,742

(22) Filed: Apr. 7, 2015

(65) Prior Publication Data

US 2016/0301900 A1 Oct. 13, 2016

(51) Int. Cl.
| | |
|---|---|
| *G06F 3/041* | (2006.01) |
| *G06F 3/042* | (2006.01) |
| *G03B 21/62* | (2014.01) |
| *H04N 9/31* | (2006.01) |
| *G03B 17/54* | (2006.01) |
| *G03B 21/10* | (2006.01) |

(52) U.S. Cl.
CPC ......... *G06F 3/0416* (2013.01); *G03B 17/54* (2013.01); *G03B 21/62* (2013.01); *G06F 3/0425* (2013.01); *H04N 9/3194* (2013.01); *G03B 21/10* (2013.01)

(58) Field of Classification Search
CPC ........ G03B 17/54; G03B 21/10; G03B 21/62; G06F 3/0416; G06F 3/0425; H04N 9/3194
See application file for complete search history.

(56) References Cited

U.S. PATENT DOCUMENTS

| | | | | | |
|---|---|---|---|---|---|
| 5,715,622 | A | * | 2/1998 | Giordano, Jr. | .......... G09F 3/204 40/448 |
| 6,061,177 | A | * | 5/2000 | Fujimoto | .............. G06F 3/0425 345/175 |
| 6,543,688 | B1 | * | 4/2003 | Massaro | ............... A47F 5/0068 235/383 |
| 6,545,670 | B1 | * | 4/2003 | Pryor | .................... G06F 3/0425 345/156 |
| 6,917,469 | B2 | * | 7/2005 | Momose | ............. G03B 21/625 359/453 |
| 7,466,843 | B2 | * | 12/2008 | Pryor | ..................... B60K 35/00 382/103 |
| 7,489,303 | B1 | * | 2/2009 | Pryor | ..................... B60K 35/00 345/173 |
| 7,515,143 | B2 | * | 4/2009 | Keam | ................... G06F 3/0421 178/18.01 |

(Continued)

*Primary Examiner* — Michael J Jansen, II

(74) *Attorney, Agent, or Firm* — Larry E. Henneman, Jr.; Henneman & Associates, PLC

(57) ABSTRACT

A touch screen display includes a diffuser screen, a projector, a camera, an infrared (IR) light source, and a controller. The diffuser screen has a front surface and a rear surface. The projector is disposed to project images onto the rear surface of said diffuser screen, and the images are visible to a user through the diffuser screen. The camera is disposed behind the diffuser screen and aimed to capture images of a pointer near the front surface of the diffuser screen. The IR light source is disposed to direct IR light toward the rear surface of the diffuser screen, so the rays of incident IR light form an acute angle with respect to the rear surface of the diffuser screen, and so that any of the incident IR light reflected off the rear surface of the diffuser screen does not enter the camera.

24 Claims, 8 Drawing Sheets

(56) References Cited

U.S. PATENT DOCUMENTS

| | | | |
|---|---|---|---|
| 7,696,897 B2* | 4/2010 | Horii | G03B 21/13 340/5.91 |
| 7,710,391 B2* | 5/2010 | Bell | G06F 3/011 345/156 |
| 7,798,652 B2* | 9/2010 | Ikeda | A47F 11/06 353/74 |
| 7,832,874 B2* | 11/2010 | Ikeda | A47F 3/001 353/74 |
| 7,954,958 B2* | 6/2011 | Ikeda | A47F 11/06 353/74 |
| 7,954,959 B2* | 6/2011 | Ikeda | A47F 11/06 353/74 |
| 7,973,779 B2* | 7/2011 | Masalkar | G06F 3/0425 116/202 |
| 7,997,734 B2* | 8/2011 | Mochizuki | G09F 19/18 340/5.91 |
| 8,004,760 B2* | 8/2011 | Liu | G03B 21/62 353/74 |
| 8,035,612 B2* | 10/2011 | Bell | G06F 3/0428 345/156 |
| 8,035,614 B2* | 10/2011 | Bell | G06F 3/011 345/156 |
| 8,035,624 B2* | 10/2011 | Bell | G06F 3/0428 345/175 |
| 8,042,949 B2* | 10/2011 | Taylor | G06F 3/0421 345/173 |
| 8,047,657 B2* | 11/2011 | Ikeda | A47F 3/001 353/73 |
| 8,125,468 B2* | 2/2012 | Han | G06F 3/0421 178/18.11 |
| 8,167,436 B2* | 5/2012 | Ikeda | A47F 11/06 353/74 |
| 8,218,237 B2* | 7/2012 | Liu | G03B 21/62 359/443 |
| 8,269,750 B2 | 9/2012 | Li et al. | |
| 8,272,743 B2* | 9/2012 | Taylor | G06F 3/0421 345/173 |
| 8,287,374 B2* | 10/2012 | Pryor | A63F 3/00643 463/30 |
| 8,587,549 B2* | 11/2013 | Whytock | G06F 3/0416 345/173 |
| 8,654,103 B2* | 2/2014 | Ilmonen | G06F 3/0418 345/173 |
| 8,730,212 B2* | 5/2014 | Powell | G06F 3/0421 345/176 |
| 8,902,195 B2* | 12/2014 | McGibney | G06F 3/0386 250/224 |
| 9,075,482 B2* | 7/2015 | Ilmonen | G06F 3/0425 |
| 9,140,973 B2* | 9/2015 | McDowall | G03B 21/625 |
| 9,176,628 B2* | 11/2015 | Briden | G06F 3/0304 |
| 9,323,396 B2* | 4/2016 | Han | G06F 3/0425 |
| 9,343,001 B2* | 5/2016 | Asami | G06F 3/1446 |
| 9,383,864 B2* | 7/2016 | Morrison | G06F 3/0421 |
| 9,535,537 B2* | 1/2017 | Large | G06F 3/0425 |
| 9,600,224 B2* | 3/2017 | Ishikawa | G06F 3/147 |
| 9,703,179 B2* | 7/2017 | Bonner | G09F 19/18 |
| 9,774,134 B2* | 9/2017 | Bonner | H01R 25/16 |
| 9,939,715 B2* | 4/2018 | Lin | G03B 21/10 |
| 10,042,478 B2* | 8/2018 | Capps | G03B 21/62 |
| 10,152,291 B2* | 12/2018 | Fan | G06F 3/1431 |
| 10,304,033 B2* | 5/2019 | Jones | G06K 7/1095 |
| 10,339,579 B2* | 7/2019 | Bonner | G06F 3/1423 |
| 10,719,861 B2* | 7/2020 | Bonner | G06Q 10/087 |
| 2004/0263966 A1* | 12/2004 | Momose | G03B 21/625 359/453 |
| 2005/0064936 A1* | 3/2005 | Pryor | A63F 3/00643 463/36 |
| 2005/0110964 A1* | 5/2005 | Bell | G06F 3/011 353/122 |
| 2005/0122308 A1* | 6/2005 | Bell | G06F 3/011 345/156 |
| 2005/0162381 A1* | 7/2005 | Bell | G06F 3/011 345/156 |
| 2005/0259322 A1* | 11/2005 | Boecker | G03B 21/62 359/460 |
| 2005/0276448 A1* | 12/2005 | Pryor | B60K 35/00 382/103 |
| 2007/0063981 A1* | 3/2007 | Galyean, III | G06F 3/0421 345/173 |
| 2007/0200970 A1* | 8/2007 | Keam | G06F 3/0421 349/58 |
| 2007/0229767 A1* | 10/2007 | Ikeda | A47F 5/0018 353/28 |
| 2008/0055087 A1* | 3/2008 | Horii | G03B 21/13 340/572.1 |
| 2008/0122799 A1* | 5/2008 | Pryor | G06F 3/0312 345/173 |
| 2008/0150890 A1* | 6/2008 | Bell | G06F 3/011 345/156 |
| 2008/0150913 A1* | 6/2008 | Bell | G06F 3/0428 345/175 |
| 2008/0151197 A1* | 6/2008 | Mochizuki | G09F 19/18 353/74 |
| 2008/0190875 A1* | 8/2008 | Ikeda | A47F 3/001 211/153 |
| 2008/0204672 A1* | 8/2008 | Ikeda | A47F 3/001 353/78 |
| 2009/0033637 A1* | 2/2009 | Han | G06F 3/0421 345/175 |
| 2009/0109193 A1* | 4/2009 | Masalkar | G06F 3/0425 345/175 |
| 2009/0219253 A1 | 9/2009 | Izadi et al. | |
| 2009/0276734 A1* | 11/2009 | Taylor | G06F 3/0421 715/863 |
| 2010/0182137 A1* | 7/2010 | Pryor | G01C 21/3664 340/425.5 |
| 2010/0302196 A1* | 12/2010 | Han | G06F 3/0425 345/173 |
| 2010/0328615 A1* | 12/2010 | Ikeda | A47F 5/0018 353/28 |
| 2011/0043490 A1* | 2/2011 | Powell | G06F 3/0421 345/176 |
| 2011/0050640 A1* | 3/2011 | Lundback | G06F 3/041 345/175 |
| 2011/0050650 A1* | 3/2011 | McGibney | G06F 3/0386 345/175 |
| 2011/0096394 A1* | 4/2011 | Liu | G03B 21/62 359/457 |
| 2011/0102750 A1* | 5/2011 | Ikeda | A47F 3/001 353/78 |
| 2011/0199585 A1* | 8/2011 | Ikeda | A47F 3/001 353/78 |
| 2011/0205500 A1* | 8/2011 | Ikeda | A47F 5/0018 353/78 |
| 2011/0227876 A1* | 9/2011 | Ilmonen | G06F 3/0425 345/175 |
| 2011/0241984 A1* | 10/2011 | Morrison | G06F 3/0421 345/157 |
| 2012/0019789 A1* | 1/2012 | Liu | G03B 21/62 353/81 |
| 2012/0038588 A1* | 2/2012 | Li | G06F 3/0428 345/175 |
| 2012/0038891 A1* | 2/2012 | Taylor | G06F 3/0421 353/28 |
| 2012/0113062 A1* | 5/2012 | Briden | G06F 3/0304 345/175 |
| 2012/0119977 A1* | 5/2012 | Asami | G06F 3/1446 345/1.3 |
| 2012/0127128 A1* | 5/2012 | Large | G06F 3/0425 345/175 |
| 2012/0206416 A1* | 8/2012 | Ilmonen | G06F 3/0425 345/175 |
| 2013/0002591 A1* | 1/2013 | Whytock | G06F 3/0416 345/173 |
| 2013/0176398 A1* | 7/2013 | Bonner | G09F 19/18 348/46 |

(56) References Cited

U.S. PATENT DOCUMENTS

| | | | | |
|---|---|---|---|---|
| 2013/0285987 A1* | 10/2013 | Ilmonen | ............... | G06F 3/0425 |
| | | | | 345/175 |
| 2014/0152904 A1* | 6/2014 | McDowall | ............ | G03B 21/10 |
| | | | | 348/745 |
| 2014/0370980 A1* | 12/2014 | Czyzewski | ......... | G07F 17/3211 |
| | | | | 463/31 |
| 2015/0102993 A1* | 4/2015 | Gadjali | .................. | G06F 3/038 |
| | | | | 345/156 |
| 2015/0248863 A1* | 9/2015 | Ishikawa | ............... | G06F 3/147 |
| | | | | 345/207 |
| 2016/0188122 A1* | 6/2016 | Capps | .................. | G06F 3/0425 |
| | | | | 345/175 |
| 2016/0238920 A1* | 8/2016 | Lin | ........................ | G03B 21/10 |
| 2016/0301900 A1* | 10/2016 | Liu | ........................ | G06F 3/0416 |
| 2016/0328767 A1* | 11/2016 | Bonner | ............. | G06Q 30/0625 |
| 2016/0344135 A1* | 11/2016 | Bonner | ................. | H01R 25/16 |
| 2017/0109115 A1* | 4/2017 | Fan | ........................ | G06F 3/1431 |
| 2017/0285449 A1* | 10/2017 | Bonner | .................. | G09F 19/18 |
| 2018/0075405 A1* | 3/2018 | Jones | ..................... | G09F 23/06 |
| 2018/0330416 A1* | 11/2018 | Bonner | ............. | G06Q 30/0625 |
| 2018/0349973 A1* | 12/2018 | Bonner | ............. | G06Q 30/0625 |
| 2018/0365642 A1* | 12/2018 | Bonner | ............. | G06Q 10/0836 |

\* cited by examiner

TOUCH SCREEN REAR PROJECTION DISPLAY

BACKGROUND OF THE INVENTION

Field of the Invention

This invention relates generally to touch screen displays, and more particularly to rear projection touch screen displays.

Description of the Background Art

Touch screen displays are known. A typical touch screen includes a display surface upon which images are displayed. Touch screens additionally include a means of detecting the position of a pointer (e.g., a stylus, the finger of a user, etc.) when the pointing object comes into contact with the display surface.

One means of detecting the position of the pointer is to capture an image of the pointer through the display surface. For example, a display can include an infrared (IR) camera positioned behind the display surface and focused to capture an image of the display surface. When software analyzing the captured images detects the presence of "spot" on the display surface, the "spot" is presumed to be caused by the pointer, and the location of the spot is taken as user input (e.g., the selection of an object displayed at the determined location of the pointer).

In order to make the image of the pointer more distinguishable, some systems employ an IR light source. The IR light source is positioned behind the display surface and emits IR light toward the display surface at a relatively low angle of incidence (e.g., close to normal) to illuminate the pointer through the display surface. Although, illumination of the pointer can improve the contrast of the captured images, IR light reflected off of the back of the display surface can significantly reduce the contrast of the captured images.

What is needed, therefore, is a touch screen display wherein the images of a pointer through a display screen are easier to discern. What is also needed is a touch screen display that facilitates the illumination of a pointer through the display surface without subjecting the camera to light reflected off of the back of the display surface.

SUMMARY

The present invention overcomes the problems associated with the prior art by providing a touch screen display with a light source disposed to direct light at the rear surface of a diffuser screen at an acute angle. The invention facilitates the illumination of a pointer near the front surface of the diffuser screen, while preventing light reflecting off of the rear surface of the diffuser screen from entering a camera disposed behind the diffuser screen.

An example touch screen display includes a diffuser screen, a projector, a camera, an infrared (IR) light source, and a controller. The diffuser screen has a front surface to be viewed by a user and a rear surface. The projector is disposed to project images onto the rear surface of said diffuser screen, and the images are visible to the user through the diffuser screen. The camera is disposed behind the diffuser screen and aimed to capture images of a pointer near the front surface of the diffuser screen. The IR light source is disposed to direct IR light toward the rear surface of the diffuser screen, so the rays of incident IR light form an acute angle with respect to the rear surface of the diffuser screen, and so that any of the incident IR light reflected off the rear surface of the diffuser screen does not enter the camera. The controller is operative to control the projector and responsive to the images of the pointer near the front surface of the diffuser screen, which indicate user selections.

In a particular embodiment, the touch screen display additionally includes a support structure. The support structure includes a front portion, a rear portion, and a side portion. The front portion is coupled to the diffuser screen. The rear portion of the support structure is disposed opposite the diffuser screen, and the camera is mounted at the rear portion. The side portion extends between an edge of the rear portion and an edge of the front portion, and the IR light source is mounted adjacent the side portion. In the disclosed embodiments, the IR light source is disposed closer to the front portion of the support structure than to the rear portion of the support structure.

The support structure additionally includes a second side portion extending between an opposite edge of the rear portion and an opposite edge of the front portion. A second IR light source is coupled to the second side portion, so that the rays of incident IR light from the second IR light source form an acute angle with respect to the rear surface of the diffuser screen, and so that any of the incident IR light from the second IR light source that is reflected off of the rear surface of the diffuser screen does not enter the camera. The second IR light source is also disposed closer to the diffuser screen than to the rear portion of the support structure.

In another example touch screen display, the IR light source is disposed adjacent the rear surface of the diffuser screen near an edge of the diffuser screen. The diffuser screen has a width and a length, and the length is greater than the width. The IR light source includes a plurality of IR light sources disposed adjacent the rear surface of the diffuser screen and distributed along a long edge of the diffuser screen. Optionally, the IR light source includes a plurality of IR light sources disposed adjacent the rear surface of the diffuser screen and distributed along both long edges of the diffuser screen. In an even more particular example embodiment, the IR light source includes a second plurality of IR light sources disposed adjacent the rear surface of the diffuser screen and distributed along both short edges of the diffuser screen.

In another embodiment, the diffuser screen has two long edges and two short edges, and the IR light source is disposed at one of the short edges. Optionally, a second IR light source is disposed at the other of the short edges.

In the disclosed embodiments, the diffuser screen has a length and a width, and the length is at least ten times the width. In a particular embodiment, the length is twelve times the width.

Another touch screen display includes a diffuser screen, a display, an image capture device, a light source, and a controller. The diffuser screen has a front surface to be viewed by a user and a rear surface. The display is visible to the user through the diffuser screen. The image capture device is disposed behind the diffuser screen and is configured to capture images of a pointer near the front surface of the diffuser screen. The light source emits light in the sensitivity range of the image capture device and is disposed adjacent the rear surface of the diffuser screen at an edge of the diffuser screen. The light source directs light toward the rear surface of the diffuser screen to illuminate the pointer through the diffuser screen. The controller is operative to control the projector and is responsive to the images of the pointer near the front surface of the diffuser screen.

The image capture device has an optical axis, and light emitted from the light source intersects the optical axis of the image capture device. At least a portion of the light emitted from the light source travels in a direction perpendicular to the optical axis of the image capture device. The light emitted from the light source and reflected off the rear surface of the diffuser screen is directed away from the image capture device.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a touch screen display with a light source disposed to direct light at the rear surface of a diffuser screen at an acute angle. In the following description, numerous specific details are set forth (e.g., the position of cameras and projectors within the touch screen display) in order to provide a thorough understanding of the invention. Those skilled in the art will recognize, however, that the invention may be practiced apart from these specific details. In other instances, details of well known electronic assembly practices (e.g., touch screen display assembly, camera mounting, projector alignment, etc.) and components (e.g., chassis, housing, etc.) have been omitted, so as not to unnecessarily obscure the present invention.

Figure 1:
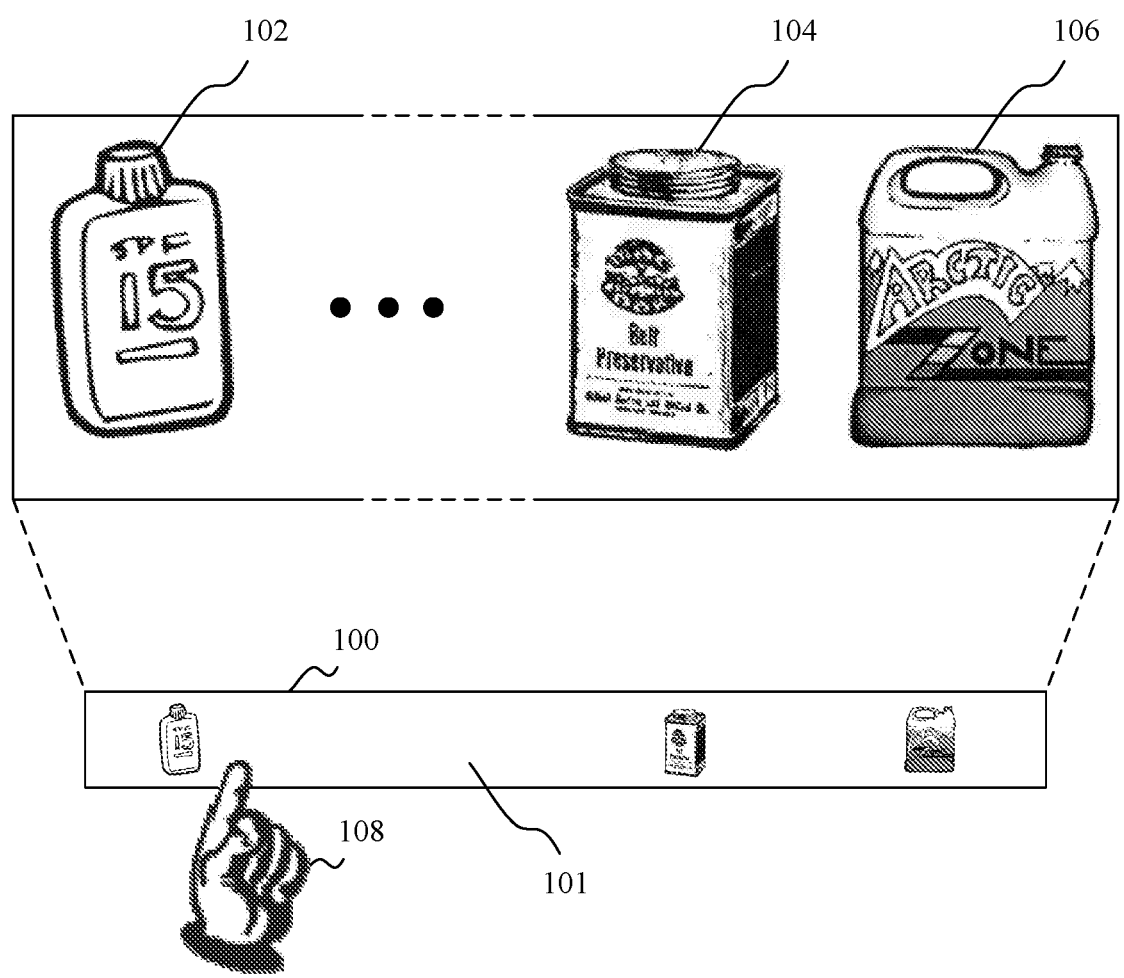
FIG. 1 is front view of a touch screen display.

FIG. 1 is front view of a touch screen, rear projection display 100. Display 100 is useful, for example, for interacting with customers in supermarkets. In this example supermarket embodiment, the display size is 4"×48". Display 100 can be fixed on or under shelve that display products for sale. It should be understood, however, that the invention is not limited to this or any other particular size. Indeed, the display can have any dimensions that are suitable for any particular application.

A projection display (not visible in the view of FIG. 1) projects an image on a screen 101 from the rear side (opposite to a customer) of screen 101. In the present example, screen 100 displays images corresponding to a plurality of products including a first product 102, a second product 104, a third product 106, and other products not explicitly shown in the view of FIG. 1. The customer can use his finger 108 as a pointer to touch or closely point to any of the products displayed on screen 101 to select that product. For example, in response to the user selecting first product 102 on screen 101, the projection display can project a new image on screen 101, which provides information about first product 102. The customer may continue to interact with touch screen display 100 by touching or closely pointing his finger 108 to any selections displayed on screen 100. The user's interaction with touch screen display 100 is substantially similar to a user's interaction with any other touch screen device such as a computer, a tablet, a mobile phone, etc. In particular, the user can navigate through many screens of available information by selecting (pointing to) certain images on the screen 101.

Figure 2A:
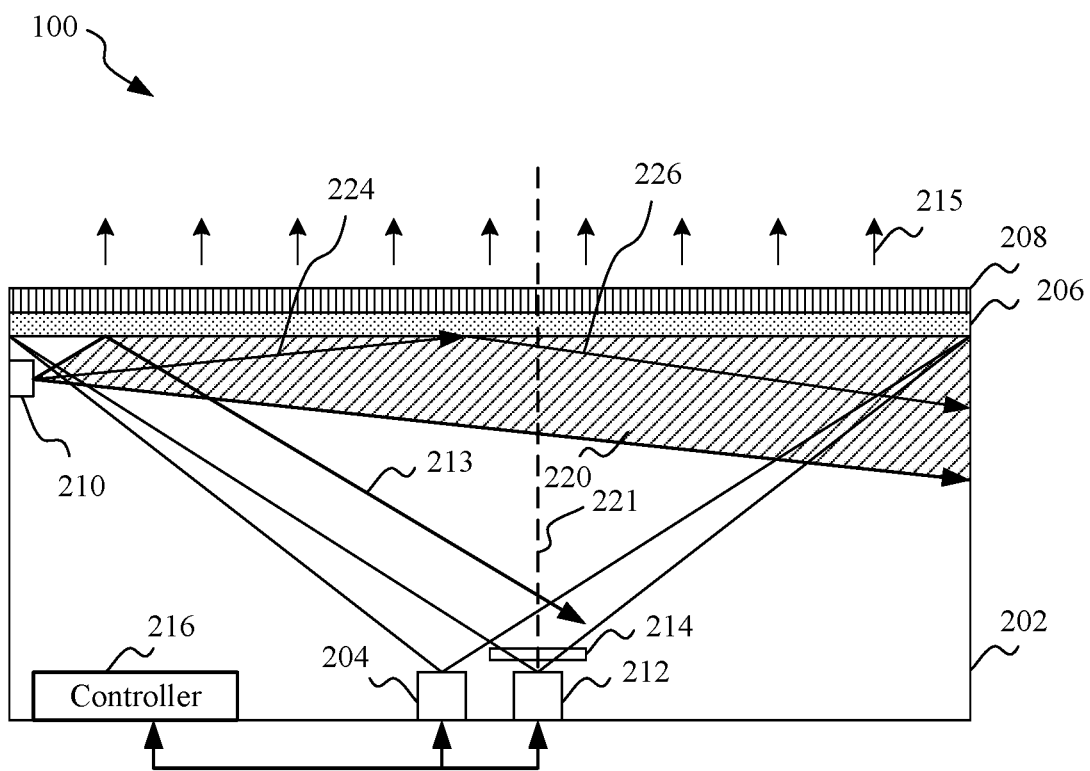
FIG. 2A is a block diagram of the touch screen display of FIG. 1.

FIG. 2A is a block diagram of touch screen display 100 of FIG. 1. In particular, touch screen display 100 is an infrared (IR) touch screen rear projection display. Touch screen display 100 includes a housing 202, a projection display 204, a diffuser screen 206, a Fresnel lens screen 208, an IR light source 210, an IR camera 212, an IR pass filter 214, and a controller 216.

Figure 2B:
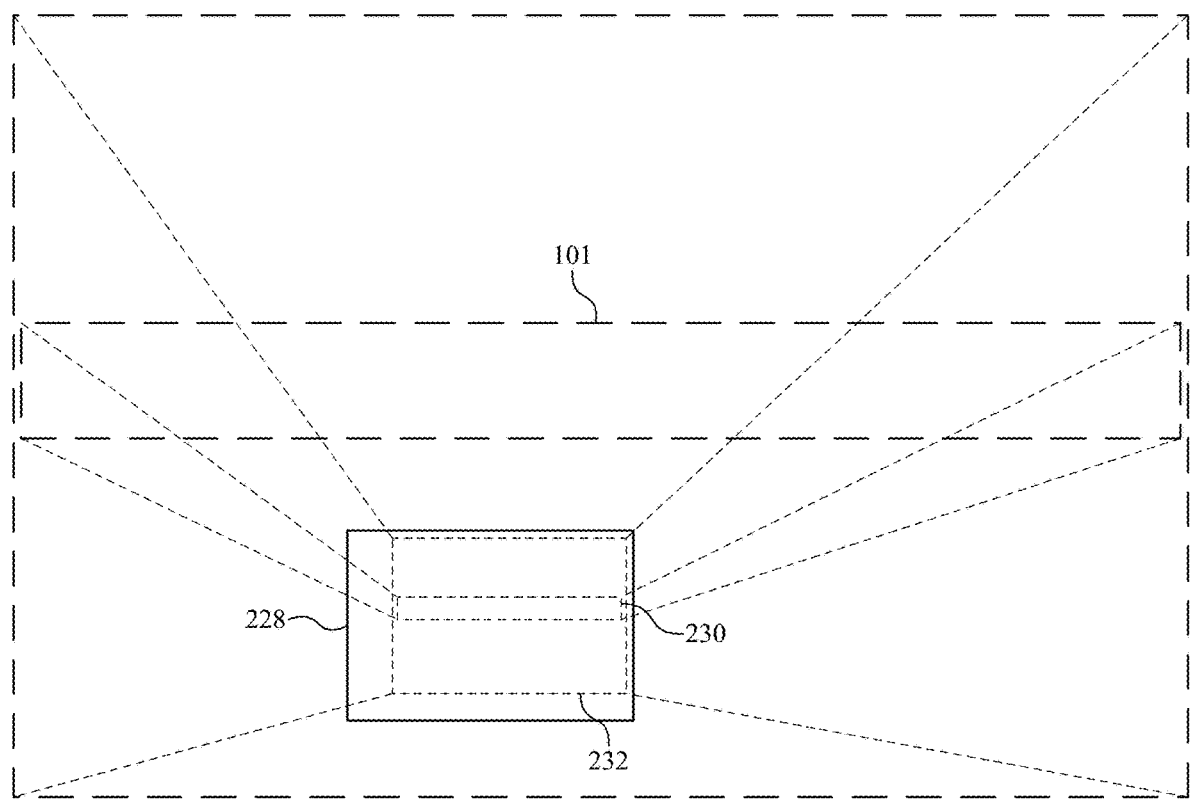
FIG. 2B is a rear view of a display screen and a projection display of the touch screen display of FIG. 1.

Projection display 204 is disposed within housing 202 and projects an image on diffuser screen 206. Fresnel lens screen 208 (optional) is disposed adjacent the front surface of diffuser screen 206 (i.e., on the viewer's side of diffuser screen 206 and opposite to projection display 204). Fresnel lens screen 208 further spreads the light diffused by diffuser screen 206 for better viewing of the image projected by projection display 204. Projection display 204 can be a custom made projection display having an LCOS (liquid crystal on silicon) display panel (not shown). The aspect ratio of the LCOS display panel can be the same as the aspect ratio display screen 101. Alternatively, as shown in FIG. 2B, the aspect ratio of an LCOS display panel 228 can be different than the aspect ratio of screen 101, and projection display 204 can use only a subset 230 of the pixels 232 of LCOS display panel 228 having the same aspect ratio as display screen 101. In either case, the size of the image projected by projection display 204 can correspond to the size of screen 101.

IR light source 210 emits IR light 220 illuminating diffuser screen 206 and Fresnel lens screen 208. A portion 215 of illuminating IR light 220 transmits through diffuser screen 206 and Fresnel lens screen 208, because diffuser screen 206 and Fresnel lens screen 208 are transparent at the wavelength of IR light 220 emitted by IR light source 210. IR light source 210 can be an LED or any other light source now known or yet to be developed. Another portion 224 and 226 of IR light 220 is reflected off of the back surface of diffuser screen 206.

Camera 212 is disposed within housing 202 behind diffuser screen 206 and directed toward diffuser screen 206 to capture images of finger 108 (or any other pointer) near the front surface diffuser screen 206. An IR pass filter 214 is disposed in front of camera 212 to let IR light 220 pass through filter 214 and into camera 212. IR pass filter 214 blocks light of wavelengths different than IR light 220 (e.g., visible light) to prevent such light from entering into camera 212. Alternatively, camera 212 is specifically an IR camera, and IR pass filter 214 might not be necessary and can therefore be omitted.

Touch screen 100 includes a support structure, for example housing 202 and/or a chassis (not shown). Camera 212 and projection display 204 are positioned at a rear portion of the support structure (e.g., coupled to the rear wall of housing 202 or a nearby portion of a chassis. A front portion of the support structure is coupled to the diffuser screen. Side portions of the support structure extend between respective edges of the rear portion and respective edges of the diffuser screen. IR light source 210 is mounted adjacent one of the side portions of the support structure near the diffuser screen.

IR light source 210 is positioned so that IR light 220 emitted by IR light source 210 does not directly enter camera 212. As shown in FIG. 2A, the rays of illuminating IR light 220 intersect an optical axis 221 of camera 212 and are not directed into the optical aperture (not shown) of camera 212. In addition, IR light source 210 is positioned so that the rays 226 of IR light 220 reflecting off of the rear surface of diffuser screen 206 are not directed into the optical aperture of camera 212. As shown in FIG. 2A, edge ray 213 reflecting off of diffuser screen 206 intersects optical axis 221 in front of camera 212 and does not enter the aperture of camera 212. Thus, the direction and the shadow of illuminating IR light 220 is determined by the position and direction of IR light source 210, such that camera 212 is in the shadow of illuminating IR light 220. Because no reflected or directly transmitted IR light enters to camera 212, camera 212 detects a dark background.

Positioning IR light source near an edge of diffuser screen 206 facilitates the illumination of the majority of diffuser screen 206, while still preventing IR light 220 reflected off of the rear surface of diffuser screen 206 from entering camera 212. In this example embodiment, IR light source 210 is disposed on a side wall of housing 202 near diffuser screen 206. IR light source 210 is not disposed next to camera 212, which is disposed on a rear wall of housing 202, because a portion of IR light emitted by IR light source 210 would be reflected off of the back surface of diffuser screen 206 and enter through the aperture of camera 212. In contrast, in this example embodiment, IR light 220 reflected off of the rear surface of diffuser screen 206 does not enter camera 212.

Position IR light source 210 near an edge of diffuser screen 206 is contrary to conventional wisdom in the art. However, preventing any IR light 220 reflected off of the rear surface of diffuser screen 206 from entering camera 212 provides a darker background and thereby improves the contrast of the captured images of finger 108 (or other pointers) through diffuser screen 206.

Controller 216 provides overall coordination and control for touch screen display 100. Controller is electrically coupled to projection display 204 and camera 212. Controller 216 provides image data to projection display 204 corresponding to images to be displayed on diffuser screen 206. Controller 216 also analyzes images captured by camera 212 to determine if a user has selected a particular image being displayed. Responsive to a determination that a user has selected a particular image, controller 216 can provide new image data to projection display 204 corresponding to the user's selection. Controller 216 can include sufficient memory to store all images to be displayed on diffuser screen 206, or controller can have a wired or wireless communication link with an external device to provide image data and programing updates as needed.

Figure 2C:
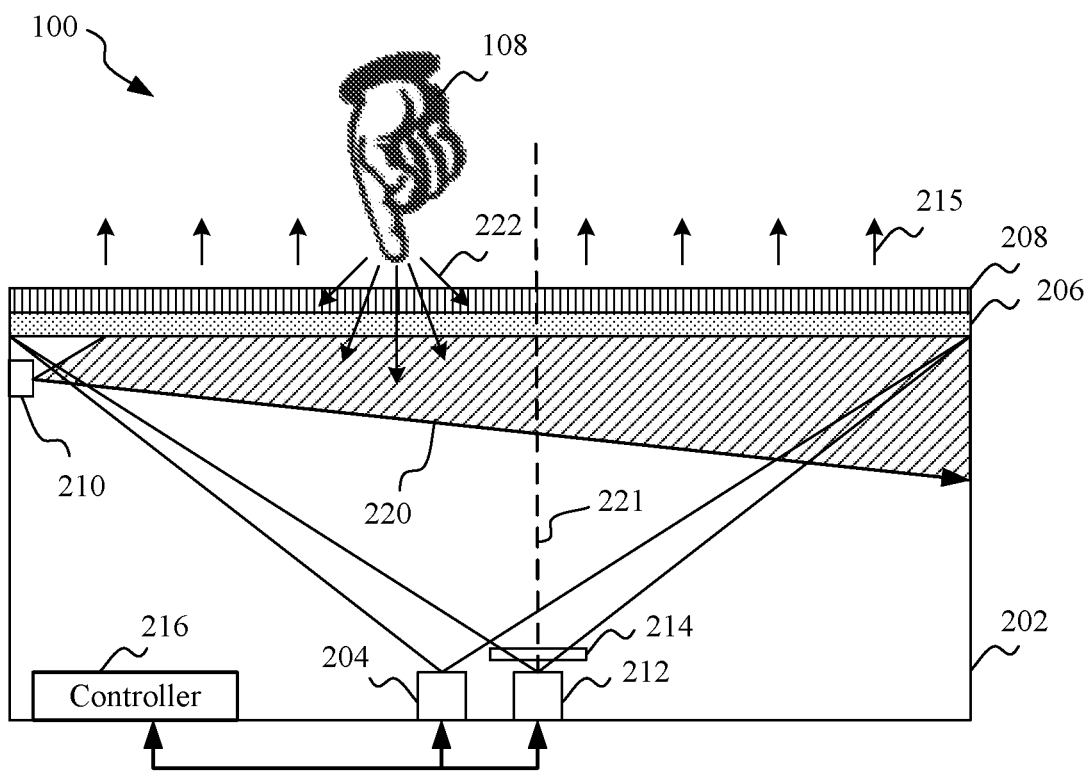
FIG. 2C is a block diagram of the touch screen display of FIG. 1 with a pointer scattering infrared (IR) light.

FIG. 2C is a block diagram of the touch screen display of FIG. 1 with a pointer (finger 108) near the front surface of Fresnel lens screen 208 scattering infrared (IR) light. Finger 108 of a customer (not shown) is touching or closely pointing to Fresnel lens screen 208 (or diffuser screen 206 if there is no Fresnel lens screen 208). A portion of illuminating IR light 220 transmitted through diffuser screen 206 and Fresnel lens screen 208 illuminates finger 108. Finger 108 reflects a portion IR illuminating light 220, which becomes reflected IR light 222. Some of reflected IR light 222 passes through IR pass filter 214 and is detected by camera 212. In other words, camera 212 captures a bright image of finger 108 against a dark background. Controller 216 analyzes the captured images to determine the relative position of finger 108 and provides image data to projection display 204 accordingly.

Figure 3:
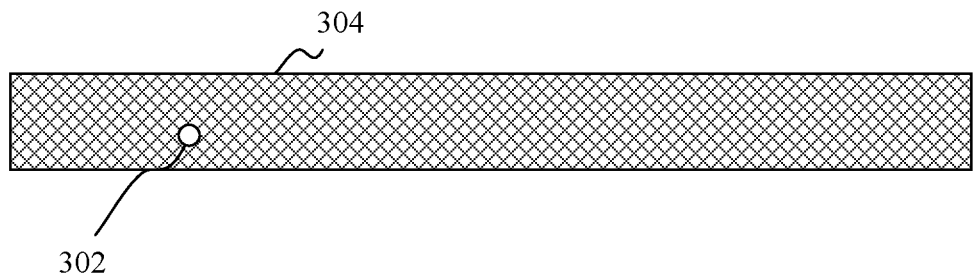
FIG. 3 is a rear view of a display screen of the touch screen display of FIG. 1.

FIG. 3 is a rear view of diffuser screen 206, as viewed by camera 212. Camera 212 is focused at or near diffuser screen 206. The viewed image includes a bright spot 302, which is finger 108 that scatters IR light, on a darker back ground 304. As indicated above, diffuser screen 206 provides a dark background, because diffuser screen 206 is transparent to the IR illumination light 220 and IR light 220 reflected off of the rear surface of diffuser screen 206 is directed away from camera 212. In this manner, the position of finger 108 can easily be detected by camera 212. Thus, finger 108 may be used as a pointing device to operate a system including camera 212, projection display 204, and controller 216 (e.g., a stand-alone computer, a network attached computer, etc.). The interconnections between controller 216, camera 212, and projection display 204 can be wired or wireless.

Figure 4:
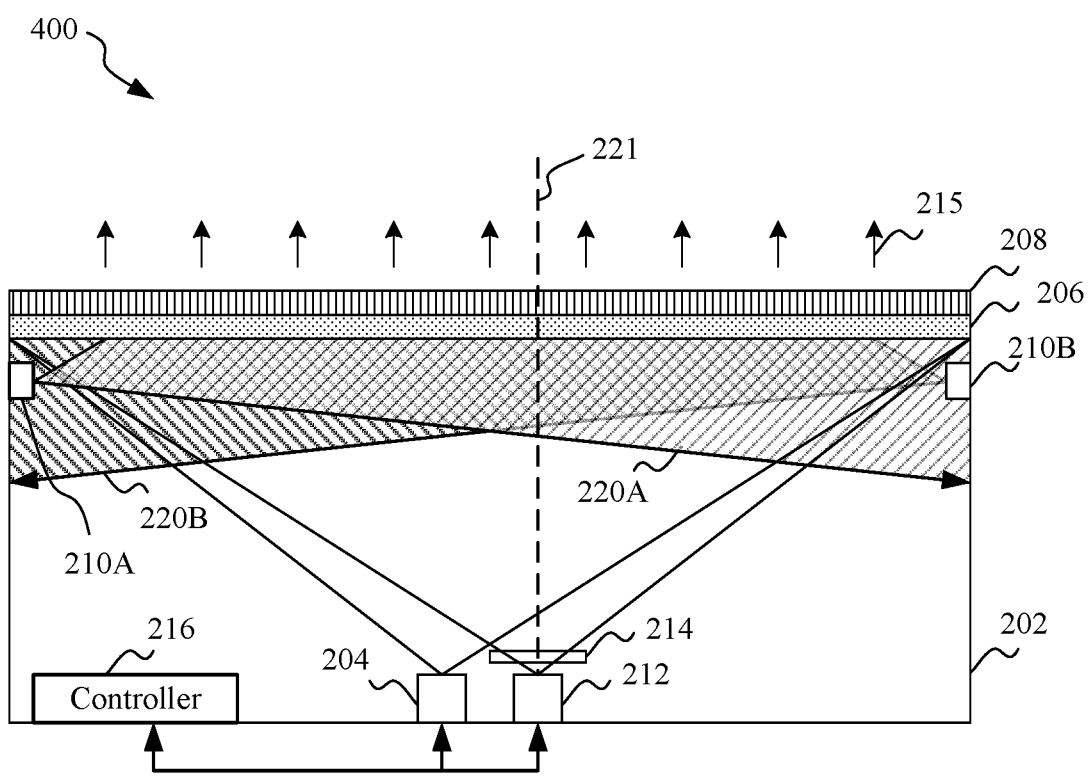
FIG. 4 is a block diagram of an alternate touch screen display.

FIG. 4 is a block diagram of an alternate touch screen projection display 400. Projection display 400 is substantially similar to projection display 100 of FIGS. 1-2C, except that touch screen display 400 includes two IR light sources 210A and 210B, which emit illuminating IR light 220A and 220B, respectively. In this manner, diffuser screen 206 and Fresnel lens screen 208 are more evenly illuminated. IR light sources 210A and 210B may be LEDs or any other light sources now known or yet to be developed.

Similar to IR light source 210 of touch screen display 100, both IR light sources 210A and 210B are positioned and directed so that any of IR light 212A and 212B reflected off of the rear surface of diffuser screen 206 does not enter camera 212. Instead, any reflected IR light 212A and 212B is directed away from camera 212.

Figure 5A:
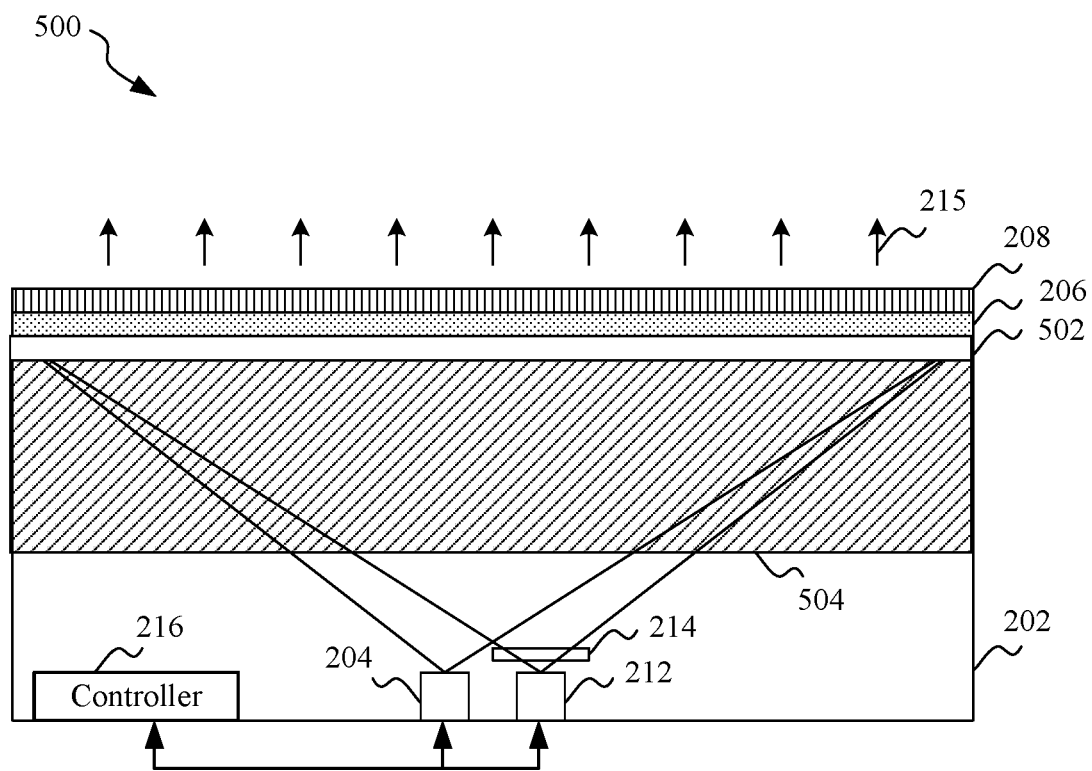
FIG. 5A is a block diagram of another alternate touch screen display.
Figure 5B:
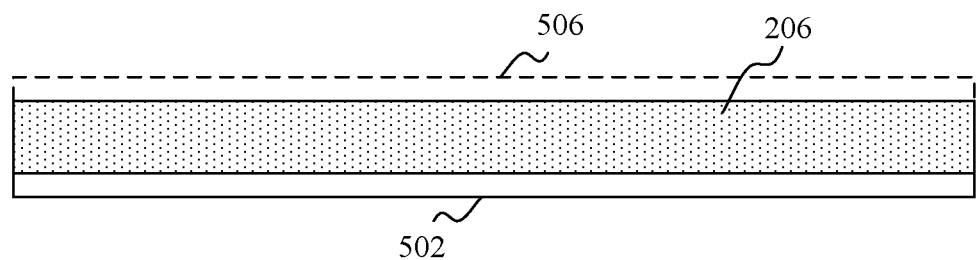
FIG. 5B shows an IR light source disposed adjacent a diffuser screen of the touch screen display of FIG. 5A.
Figure 5C:
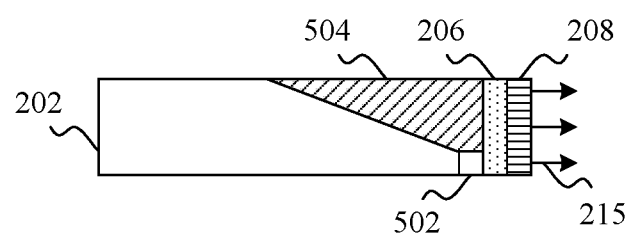
FIG. 5C shows a partial section of the IR light source disposed adjacent a diffuser screen of the touch screen display of FIG. 5A.

FIG. 5A is a block diagram (top view) of another alternate touch screen display 500. Projection display 500 is similar to projection display 100 of FIGS. 1-2C, except that projection display 500 does not use IR light source 210, which is disposed on a side of the inner wall of housing 202. Instead, projection display 500 uses an IR light source 502, which is disposed adjacent the bottom edge of diffuser screen 206, as illustrated in FIGS. 5A, 5B, and 5C. IR light source 502 emits an illuminating IR light 504.

FIG. 5B shows an IR light source 502 disposed adjacent diffuser screen 206 of touch screen display 500. The view of FIG. 5B is from behind diffuser screen 206 (from the inside of housing 202). In this example embodiment, IR light source 502 is disposed adjacent to the bottom edge of diffuser screen 206. IR light source 502 may be a line light source or a plurality of discrete light sources such as LEDs or the like. Optionally, a similar IR light source 506 (line light source or plurality of discrete light sources) can disposed adjacent the top edge of diffuser screen 206 in addition to or instead of IR light source 502. As yet another option, additional IR light sources can be distributed along the short edges of diffuser screen 206 in addition to IR light sources 502 and 506, which are distributed along the long edges of diffuser screen 206.

In this embodiment, similar to previously described embodiments, IR light source 502 and IR light source 504 (if present) are both positioned and directed so that any of IR light 504 reflected off of the rear surface of diffuser screen 206 does not enter camera 212. Instead, any reflected IR light 504 is directed away from camera 212.

FIG. 5C is a partially sectioned side view (side of housing 202 removed) of the front portion of touch screen display 500. IR light source 502 is disposed adjacent the lower edge of diffuser screen 206, and emits an illuminating IR light 504. A portion of illuminating IR light 504 transmits through diffuser screen 206 and Fresnel lens screen 208, and another portion of IR light 504 reflects off of the rear surface of diffuser screen 206. However, as described above, IR light source 502 is disposed so that none of the reflected light enters camera 212 (FIG. 5A).

Figure 6:
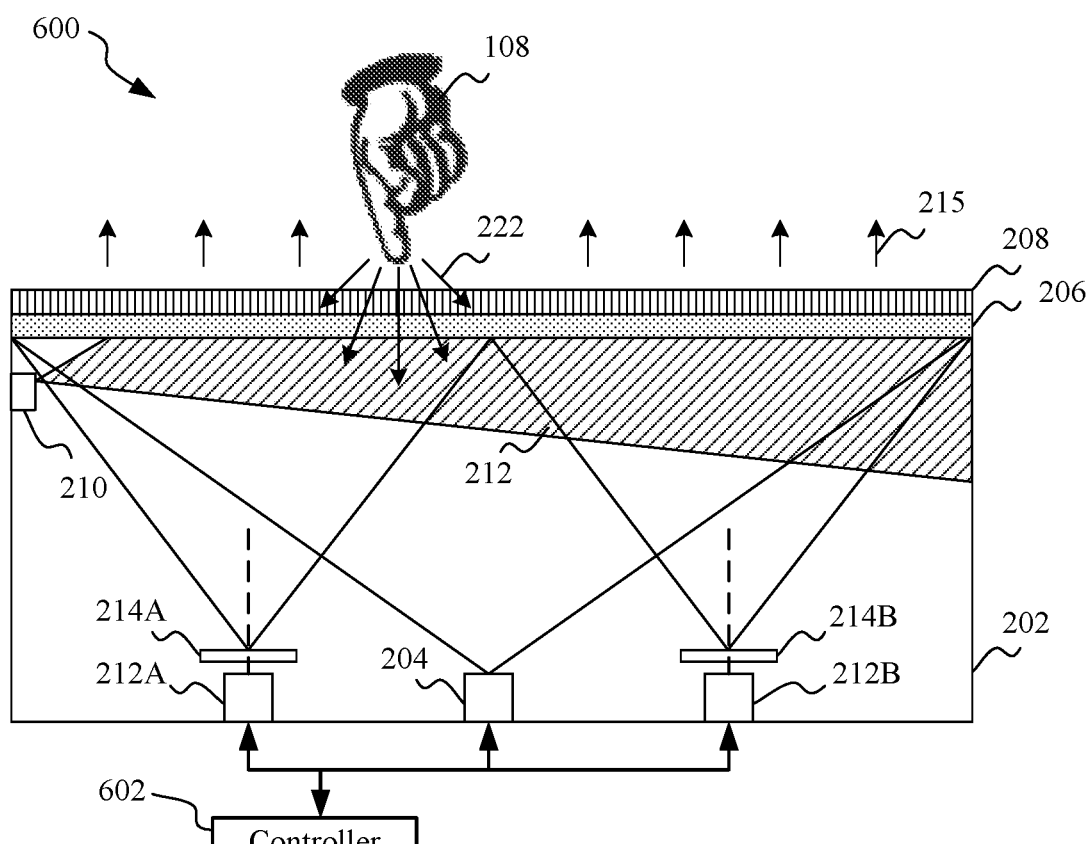
FIG. 6 is a block diagram of another alternate touch screen display.

FIG. 6 is a block diagram of another alternate touch screen display 600. To capture a wide field of view, for example an aspect ratio 4:48 or 1:12, a specially designed wide angle lens might be required. Accordingly, a specially designed wide angle lens (not shown) can be used in camera 212 (FIG. 2A). Alternatively, a plurality of cameras can be used. Each camera captures a portion of the field of view. Then, the captured fields of view are combined by a computer (e.g., controller 602) to assemble a field of view with an aspect ratio of 1:12.

IR touch screen rear projection display 600 is identical to projection display 200 of FIGS. 2A and 2C, except two cameras 212A and 212B in combination with IR pass filters 214A and 214B, respectively, are used instead of a single camera. In this manner, a wide field of view may be divided into two fields of view having smaller view angles. Each smaller field of view is captured by a respective one of cameras 212A or 212B. Controller 602 is substantially similar to controller 216 (FIG. 2A), except that controller 602 includes additional code/functionality to combine the two separate fields of view. It should be understood that "combining" the fields of view does not require a physical combination of the images, only that the positional relationships between the images be known so that controller 602 can determine the location of finger 108 by analyzing the images.

Alternate embodiments are not limited to two cameras. Indeed, any number of cameras may be used depending on the particular application and/or screen aspect ratio.

The description of particular embodiments of the present invention is now complete. Many of the described features may be substituted, altered or omitted without departing from the scope of the invention. For example, alternate configurations of IR light sources (e.g., a ring shaped IR light source encircling diffuser screen 206) may be substituted for the IR light sources shown. As another example, embodiments of the invention can employ cameras and light sources that operate at wavelengths outside of the IR spectrum. These and other deviations from the particular embodiments shown will be apparent to those skilled in the art, particularly in view of the foregoing disclosure.

I claim:

1. A touch screen display comprising:
    a shelving unit including a plurality shelves;
    a housing coupled to one of said shelves, said housing having a front, a first side wall, a second side wall, and a rear wall;
    a diffuser screen coupled to said housing and having a front surface oriented to be viewed by a user outside said housing and a rear surface facing an interior of said housing;
    a projector disposed at least partially within said housing and directed to project images onto the rear surface of said diffuser screen, said images being visible to said user through said diffuser screen;
    a camera disposed at least partially within said housing, behind said diffuser screen and aimed to capture images of a pointer near said front surface of said diffuser screen;
    an infrared (IR) light source disposed at least partially within said housing and oriented to direct IR light through said rear surface of said diffuser screen, said IR light source being oriented to direct said IR light along a plurality of paths confined within range of directions, said range of directions being limited so that none of said paths enter said camera after being reflected from said rear surface of said diffuser screen; and
    a controller operative to control said projector responsive to said images of said pointer near said front surface of said diffuser screen; and wherein
    said housing has a length measured between said first side wall and said second side wall and a depth defined by the shortest distance between said rear surface of said diffuser screen and said rear wall of said housing, said length of said housing being greater than said depth of said housing;
    incident IR light reflected off said rear surface of said diffuser screen from any IR light source of said touch screen display does not enter said camera;
    said diffuser screen has a width and a length, said length of said diffuser screen being greater than said width of said diffuser screen, said length and said width of said diffuser screen defining an aspect ratio of said diffuser screen;
    said projector includes a liquid crystal on silicon display panel including an array of pixels having an aspect ratio different than said aspect ratio of said diffuser screen; and
    said projector is configured to use only a subset of said pixels having an aspect ratio corresponding to said aspect ratio of said diffuser screen.

2. The touch screen display of claim 1, wherein said IR light source includes a plurality of IR light sources disposed adjacent said rear surface of said diffuser screen and distributed along a long edge of said diffuser screen.

3. The touch screen display of claim 2, wherein said IR light source includes a second plurality of IR light sources disposed adjacent said rear surface of said diffuser screen and distributed along a short edge of said diffuser screen.

4. The touch screen display of claim 1, wherein:
    said length of said diffuser screen is at least ten times said width.

5. The touch screen display of claim 1, wherein said IR light source provides a majority of said IR light for said touch screen display.

6. The touch screen display of claim 5, wherein said IR light source provides all of said IR light for said touch screen display.

7. The touch screen display of claim 1, wherein no IR light source directs light onto said rear surface of said diffuser screen at an angle perpendicular to said rear surface of said diffuser screen.

8. The touch screen display of claim 1, wherein said IR light source is disposed directly adjacent said rear surface of said diffuser screen near said long edge of said diffuser screen.

9. The touch screen display of claim 1, wherein each of said images of said pointer captured by said camera comprises a bright spot on a dark background, said bright spot being generated by said pointer scattering IR light.

10. The touch screen display of claim 1, wherein said IR light source is disposed closer to a front portion of said housing than to a rear portion of said housing.

11. The touch screen display of claim 1, wherein said IR light source is disposed adjacent said rear surface of said diffuser screen near an edge of said diffuser screen.

12. A touch screen display comprising:
a shelving unit including a plurality of shelves;
a housing coupled to one of said shelves, said housing having a front, a first side wall, a second side wall, and a rear wall;
a diffuser screen coupled to said housing and having a front surface oriented to be viewed by a user and a rear surface facing an interior of said housing;
a display visible to said user through said diffuser screen;
an image capture device disposed at least partially within said housing, behind said diffuser screen and configured to capture images of a pointer near said front surface of said diffuser screen, said image capture device having an optical axis;
a light source in the sensitivity range of said image capture device and disposed at least partially within said housing and oriented to illuminate said pointer through said diffuser screen, said light source being oriented to direct said light only along directions restricted to prohibit said light from entering said image capture device after being reflected from said rear of said diffuser screen; and
a controller operative to control said display responsive to said images of said pointer near said front surface of said diffuser screen; and wherein
said housing has a length measured between said first side wall and said second side wall and a depth defined by the shortest distance between said rear surface of said diffuser screen and said rear wall of said housing, said length of said housing being greater than said depth of said housing;
incident IR light reflected off said rear surface of said diffuser screen from any IR light source of said touch screen display is reflected along a direction that does not enter said camera;
said diffuser screen has a width and a length, said length of said diffuser screen being greater than said width of said diffuser screen, said length and said width of said diffuser screen defining an aspect ratio of said diffuser screen;
said display includes a liquid crystal on silicon display panel with an array of pixels having an aspect ratio different than said aspect ratio of said diffuser screen; and
said controller is configured to use only a subset of said pixels having an aspect ratio corresponding to said aspect ratio of said diffuser screen.

13. The touch screen display of claim 12, wherein said light source includes a plurality of discrete light sources distributed along a long edge of said diffuser screen.

14. The touch screen display of claim 13, wherein said light source includes a second plurality of light sources disposed adjacent said rear surface of said diffuser screen and distributed along a short edge of said diffuser screen.

15. The touch screen display of claim 12, wherein:
said length of said diffuser screen is at least ten times said width.

16. The touch screen display of claim 12, wherein each of said images of said pointer captured by said image capture device comprises a bright spot on a dark background, said bright spot being generated by said pointer scattering IR light.

17. The touch screen display of claim 12, wherein said IR light source is disposed closer to a front portion of said housing than to a rear portion of said housing.

18. A touch screen display comprising:
a shelving unit including a plurality of shelves;
a housing coupled to one of said shelves, said housing having a front, a first side wall, a second side wall, and a rear wall;
a diffuser screen coupled to said housing and having a front surface oriented to be viewed by a user outside of said housing and a rear surface facing an interior of said housing, said diffuser screen having a width and a length greater than said width, said length and said width of said diffuser screen defining an aspect ratio of said diffuser screen;
a projector disposed at least partially within said housing to project images onto the rear surface of said diffuser screen, said images being visible to said user through said diffuser screen, said projector including a liquid crystal on silicon display panel having an array of pixels with an aspect ratio different than said aspect ratio of said diffuser screen and being configured to use only a subset of said pixels having an aspect ratio corresponding to said aspect ratio of said diffuser screen;
a camera disposed at least partially within said housing, behind said diffuser screen and aimed to capture images of an object near said front surface of said diffuser screen;
a plurality of primary infrared (IR) light sources disposed at least partially within said housing to direct IR light through said rear surface of said diffuser screen, said IR light sources being oriented to direct said IR light only in directions that prohibit said IR light from entering said camera after being reflected from said rear surface of said diffuser screen; and
a controller operative to control said projector responsive to said images of said object near said front surface of said diffuser screen; and wherein
said housing has a length measured between said first side wall and said second side wall and a depth defined by the shortest distance between said rear surface of said diffuser screen and said rear wall of said housing, said length of said housing being greater than said depth of said housing; and
incident IR light reflected off said rear surface of said diffuser screen from any IR light source of said touch screen display does not enter said camera.

19. The touch screen display of claim 18, wherein said plurality of primary IR light sources provides a majority of said IR light for said touch screen display.

20. The touch screen display of claim 18, wherein said plurality of primary IR light sources provides all of said IR light for said touch screen display.

21. The touch screen display of claim 18, wherein no IR light source directs light onto said rear surface of said diffuser screen at an angle perpendicular to said rear surface of said diffuser screen.

22. The touch screen display of claim 18, wherein each of said plurality of primary IR light sources is disposed directly adjacent said rear surface of said diffuser screen near an edge of said diffuser screen.

23. The touch screen display of claim 18, wherein each of said images of said object captured by said camera comprises a bright spot on a dark background, said bright spot being generated by said object scattering IR light.

24. The touch screen display of claim 18, wherein said plurality of primary IR light sources is disposed adjacent said rear surface of said diffuser screen and distributed along a long edge of said diffuser screen.

\* \* \* \* \*